June 1, 1948.    C. E. MAYNARD    2,442,368
METHOD OF MAKING PLASTIC ARTICLES BY INJECTION MOLDING
Filed May 4, 1945
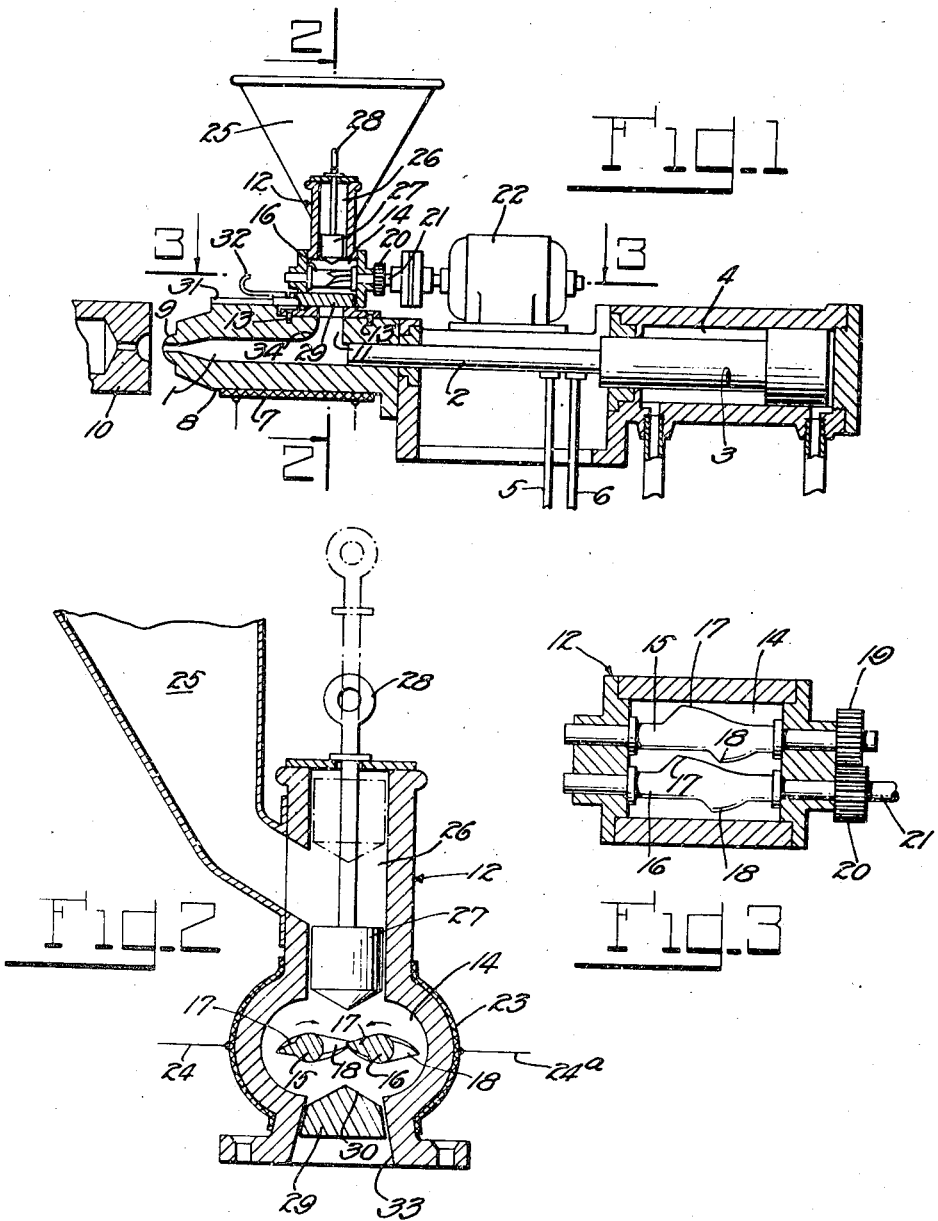
INVENTOR:
Charles Edgar Maynard
by Dike, Calver & Porter
Attys.

Patented June 1, 1948

2,442,368

UNITED STATES PATENT OFFICE 2,442,368

METHOD OF MAKING PLASTIC ARTICLES BY INJECTION MOLDING

Charles Edgar Maynard, Northampton, Mass., assignor to Pro-phy-lac-tic Brush Company, Northampton, Mass., a corporation of Delaware Application May 4, 1945, Serial No. 591,910

3 Claims. (Cl. 18—55)

This application is a continuation in part of my abandoned application Serial No. 526,551, filed March 15, 1944.

My present invention relates to an improvement in the process of making molded articles from synthetic molding materials and is particularly useful in connection with injection molding. Such synthetic molding materials are cellulose acetate and the polymers of methacrylic acid esters, styrene, vinyl and vinylidene chlorides, ethyl cellulose, phenol formaldehyde, urea formaldehyde resins, etc. In the manufacture of such articles the raw material is ordinarily mixed with whatever fillers, plasticizers, dyes, antioxidants, etc., are required and then formed into solid masses, cakes, sheets or chunks and finely ground to form a powder. While it is sometimes possible to use the molding material in other forms, it is ordinarily used in granular or powder form. Such granular material or powder contains or picks up substantial amounts of moisture and must be dried before using—usually by heating in open pans. Immediately before molding, the powder is heated to plasticize it, i. e. to convert it into a plastic or semi-fluid condition, so that it will flow properly under the molding pressure.

The entire mass must be uniformly heated throughout and be brought to a definite temperature, whether thermosetting or thermoplastic materials be used. Non-uniform heating, or bringing the mass to a temperature outside the proper molding range will bring about stratification and defective moldings. The critical temperature ranges for the various materials are not very wide and that portion of an injection machine which supplies the heat has been the subject of much study and experiment to overcome the difficulties which will be explained hereafter. As a result of these difficulties, it has not been considered possible in ordinary commercial practice to produce by injection molding pieces weighing much over thirty-two ounces.

The common and standard method of heating material for an injection molding machine is by means of an injection cylinder on one end of which is a nozzle from which the material is forced. On the other end is a ram. The material in granular or powder form is fed into the cylinder in front of the ram in successive measured amounts and gradually pushed towards the nozzle. The outside of the cylinder is heated by means of electrically heated bands or other means, and inside the cylinder is generally placed a torpedo or spreader, also heated if required, which forces the material into a relatively thin layer in order to allow the heat to penetrate.

This method has several disadvantages.

*First.*—As it can be readily seen, the material when it is first fed into the cylinder is still in the granular state and as it passes over the torpedo and approaches the nozzle it becomes more plastic and coalesces. Inasmuch as the ram is pushing a sizable amount of material that is not plasticized at all or only partly plasticized, a great deal of pressure is required, which pressure is far in excess of that required to force properly plasticized material into a mold. This makes necessary excessively heavy expensive equipment and the use of high pressures. Capital outlay, maintenance costs and operating costs are thereby increased.

If at any time in the ordinary molding the mass of material becomes more or less fluid because of delays or increased heating times, then the complete pressure of the plunger is exerted upon the material in the mold because the frictional losses are lower than is normally exerted. As a result, the mold is very likely to open slightly and create flash on the product. Furthermore, the over plasticized material which is of low viscosity will creep back between the cylinder and plunger, causing contaminated moldings.

*Second.*—Because the material has to be forced around a spreader into a relatively thin wall, the capacity of the cylinder for holding material is substantially reduced unless a large cylinder is used and if large moldings are desired, then the cylinder becomes extremely large and the ram correspondingly so. When this principle is carried into moldings running in excess of a pound or so, then the ram and plunger required are so large that this is an impractical approach to the problem of injection molding large pieces.

*Third.*—Because it is extremely difficult by this method to heat the material uniformly. As pointed out previously, as each measured volume of plastic enters the mold, a corresponding amount of granular material is fed into the cylinder at the rear end. If at any time there is the slightest change in the length of the cycle, then the time that these various measured volumes remain in the cylinder vary and consequently different degrees of plasticization result. To get uniformly heated injections coming out of the nozzle of the machine, each quantity of plastic material must travel always at the same rate as it passes through the cylinder from the feed to the nozzle. A standard injection cylinder invariably holds several shots at all times in the cylinder, in some cases amounting to six to eight, depending upon the size shot in relation to the cylinder being used.

The matter is further complicated by the fact that the plastic material used is generally a poor conductor of heat, and, inasmuch as the heat must come from the cylinder walls or from the torpedo if it happens to be heated, the inner layers of the material between the torpedo and the cylinder are often not the same temperature as the layers adjacent to them. This sometimes results in excessive heating of the material exposed to the metal surfaces and insufficient heating of the material at a distance from them.

*Fourth.*—Because the standard method of heating does not provide for the discharge of moisture that is trapped in the material. Consequently, the moisture is carried into the molds which results in blemishes, bubbles or a cloudy condition. To avoid this as much as possible, it has been customary as already explained to dry the powder before it is fed to the injection cylinder.

Auxiliary or feed cylinders have sometimes been used to heat and plasticize the material progressively as it is fed into the injection cylinder. Sometimes a plunger is used in such cylinders and sometimes a feed screw. These auxiliary cylinders heat the material by means of heating jackets placed around the cylinder walls and involve the same problem of getting enough heat into the center of the mass without overheating any of it. These injection devices add to the cost of the machines without making it possible to plasticize large quantities of material uniformly.

Another method is to preheat the mold material in sealed containers such as tin cans after which the plastic is forced from the container into the mold by transfer cylinders. This method is not satisfactory because preheating large cans of material may require several hours, and a sealed container is required to avoid the loss of volatile constituents such as plasticizers. Nor is the method applicable to thermosetting materials since the long preheating which is necessary may seriously reduce the plasticity or convert them in part to the insoluble, infusible state. Therefore, as far as I am aware, no one has yet succeeded in plasticizing large quantities of molding material thoroughly and uniformly or in making large moldings weighing many pounds with injection molding machines.

I have discovered that plastic stock whether in the form of molding powder, i. e. either powdered or granular, or in the form of cakes, blocks or chunks, can be easily plasticized by the internal heat developed by mechanically working the material and that such working removes moisture effectively. The mechanical working is best performed by a mixer of the Banbury type, but may also be done on open rollers of the kind commonly used in rubber manufacture or by other machines. In this way advantage is taken of the substantial amount of internal heat which is developed by the working and since the position of the various parts of the batch is constantly changed, the heating is uniform, no part of the batch is overheated and no part under-heated. Furthermore, the internal heat which is developed dries off rapidly any moisture in the batch, particularly since the parts of the batch exposed to the atmosphere are constantly changed during the working. Under ordinary conditions the amount of heat developed is so great that it is not necessary to supply heat to the walls or rollers of the mixer and in a very short time—as little as three or four minutes—a large batch of stock may be completely and uniformly plasticized. With my improved method, there is no practical limit to the amount of stock which can be plasticized and consequently to the size of the molding which may be produced since the size is not limited by the amount of stock which can be plasticized in the time between successive moldings.

In practicing my invention, I prefer to employ an internal mixer such as the so-called Banbury mixer which is a frictional mixer in which the particles are worked and the material brought quickly into a hot uniformly plastic mass. As the mass is progressively worked, the heat rises very rapidly, and uniformly throughout the mass. By building up heat in the mass through internal friction as an internal mixer of a Banbury type does, the mass can be brought to an exact temperature and the temperature rise stopped by merely dumping the material from the mixer. Therefore, there is no problem of heat conduction, from hot metal surfaces through plastic that is a poor heat conductor.

Under ordinary circumstances, the walls and rotors of the mixers, such as the Banbury, are run relatively cool. The time required to heat even the largest masses running even into hundreds of pounds is a matter of a few minutes—as little as 3 to 4—and, in every case, the materials can be brought to a uniform plasticization, and any materials that are to be distributed in the mass are uniformly dispersed because of the mixing process.

The batch or a portion of the batch may then be dumped directly into the molding machine as described in my original application, Serial No. 526,551, in which case the injection cylinder holds the mass at its dumping temperature so that every shot from this mass is of the same temperature and quality.

Plastic material which has been plasticized as described herein operates extremely satisfactorily in molding machines since the material is uniformly plasticized and the ram of the molding machine does not operate on any part of the charge which is insufficiently plasticized or has been overheated. Likewise, since no part of the material is too liquid, it does not squirt into the mold under high pressure and has less tendency to spring the sections of the mold or force them apart. The injection cylinder and ram do not need to be so strong since the plastic material can always be heated to give it very nearly the optimum degree of plasticity.

My invention also makes it possible to mix ingredients into the powder at the time of the plasticizing or heating process, thus avoiding premixing, slabbing and grinding such as now required as a standard process in the production of plastic powders. Inasmuch as the heating-up process in the Banbury mixer is the best method of mixing materials such as powders, plasticizers, anti-oxidants, etc., into the plastic, this can all be done at the same time as the powder is being heated for molding.

As previously pointed out, this saves many steps in the process of producing a powder and bringing it to the proper plasticization for injecting it into the mold. Furthermore, due to the fact that the heating time in the internal mixer is so short in comparison with the relatively long period required for the material to pass through a standard injection cylinder, there is less danger of depolymerization, discoloration and the loss of essential volatile ingredients. On the other hand, my method may be practiced satisfactorily with previously prepared molding material whether in slabs, cakes, chunks or powder.

The nature of the invention will be readily understood by the following description of the practice of the invention by the use of a mixer of the Banbury type arranged to deliver the plasticized product directly to an injection molding machine, but it will be understood that my novel method may be practiced by the use of apparatus of other types. In the accompanying drawings:

Fig. 1 is a view in side elevation of an injection molding machine equipped with a pre-plasticizing unit.

Fig. 2 is a section on the line 2—2 of Fig. 1.

Fig. 3 is a section on the line 3—3 of Fig. 1.

In the drawings there is shown an injection cylinder 1 in which an injection ram 2 is reciprocally movable. The ram is moved by a hydraulic piston 3 in a hydraulic cylinder 4. Conduits 5 and 6 may be used for supplying cooling fluids to the ram, and a heating unit 7 wrapped about the wall 8 of the injection cylinder is used to maintain the temperature of the material in the cylinder. The cylinder is tapered at the end to form a nozzle 9 adapted to cooperate with the forward section of a mold 10. A feed opening 11 is formed in the cylinder wall at a point slightly forward of the ram when it is held in its extreme rearward position, i. e., the position taken at the end of a return stroke. Mounted on the cylinder wall 8 is a pre-plasticizing unit 12 which may be secured to the wall by any suitable means such as by bolts 13. This unit has a plasticizing chamber 14 in which are placed working elements 15 and 16 which mix and work the materials in the chamber under pressure and continually change the position of all parts of the material thereby rapidly developing heat internally as a result of the working. These elements have the general shape shown in Fig. 3, the parts 17 and 18 cooperating to give material treated by them a peculiar twisting and churning motion. Their shape may be, as shown, that now used in Banbury mixers. These elements are turned through suitable gears 19 and 20, by a shaft 21 driven by a motor 22.

The molding material is fed to the plasticizing chamber 14 through a hopper 25 and a supply cylinder 26. A heavy weight 27 is placed in the pressure cylinder. The weight may be raised by suitable means acting on the handle 28 until it reaches the position indicated in dotted lines in Fig. 2. After the material is fed into the supply cylinder through the hopper, the weight is lowered until it presses the material downwardly so that it is being continually pushed against and between the rolls. A ram or plunger may be used instead of the weight if desired, and operated by mechanical or hydraulic means as preferred.

A gate 29 having a V-shaped top surface 30 is held in suitable guideways 31. This gate constitutes the bottom of the plasticizing chamber during operation. When the material is thoroughly plasticized and it is time to feed the mass to the injection cylinder, the gate is withdrawn by a handle 32 and the mass of semi-fluid material is dumped directly into the cylinder. The next forward stroke of the ram pushes it through the nozzle of the machine and into the mold.

In order to facilitate delivery of the mass of molding material to the cylinder, the lower walls 33 of the converting unit are preferably slanted as shown in Fig. 2 to provide a progressively larger delivery chute in the direction of the cylinder. The forward wall of the feed opening 11 in the cylinder wall 8 is also preferably rounded as shown at 34 in Fig. 1 so that the material will flow forward in the cylinder with as little resistance as possible.

The invention will be further illustrated by the following examples.

*Example 1.*—100 lbs. of ready prepared undried molding powder at room temperature were charged in the cold mixer, the mixer was then run for about 3½ to 4 minutes at about 68 R. P. M. At the end of this time the mass was found to be homogeneous, dry and plastic, and in satisfactory condition to be molded. The temperature of the mass was about 400° F. It was observed that after the mixer was started the power consumed rose steadily to a peak after which it fell as the mass softened and became more plastic from the heat generated by the working.

*Example 2.*—The following ingredients in the following proportions were charged into the cold mixer

| | |
|---|---|
| Methyl methacrylate in cakes_____pounds__ | 100 |
| Plasticizer _____do____ | 5 |
| Blue dye_____ounces__ | 0.5 |

The mixer was run for 4 minutes, and the mass discharged. It was found to be thoroughly plasticized, homogeneous, and without color streaks.

I claim:

1. The method of making plastic articles by injection molding which comprises working a molding material with a twisting and churning motion in a confined space and under pressure until the heat derived from the friction caused by working has rendered the mass completely and uniformly plasticized in condition for molding, thereafter transferring the plasticized mass from said confined space to the cylinder of an injection molding machine with sufficient rapidity to prevent any substantial cooling of the mass, and injecting a mold charge of material so prepared and while still retaining substantially all of the heat imparted to it in said confined space into the mold.

2. The method of making plastic articles by injection molding which comprises working a molding material in a confined space by the application of power and mechanical pressure in twisting motion on the material to develop heat therein by friction, continuing the working while the power consumed thereby rises steadily to a peak, stopping the working when the material has become converted by said working into a hot doughy flowable plasticized mass and the power consumed by the working has passed its peak and started to fall, thereafter transferring the plasticized mass from said confined space to the cylinder of an injection molding machine with sufficient rapidity to prevent substantial change of the condition obtained by working in said confined space, and injecting a mold charge of material so prepared and while retaining substantially all of its heat and homogeneous condition into the mold.

3. The method of making plastic articles by injection molding which comprises working a molding material with a twisting and churning motion under pressure in a confined space and until the heat derived from the friction caused by working has rendered the mass completely and uniformly plasticized in condition for molding, thereafter discharging the plasticized mass from said confined space while in said condition and transferring it by gravity directly to the cylinder of an injection molding machine without any substantial cooling of the mass, and injecting a mold charge of material so prepared and while still homogeneous and retaining substantially all of the heat imparted to it in said confined space into the mold.

CHARLES EDGAR MAYNARD.

REFERENCES CITED

The following references are of record in the file of this patent:

UNITED STATES PATENTS

| Number | Name | Date |
|---|---|---|
| 1,800,180 | Day | Apr. 7, 1931 |
| 1,918,532 | Geyer | July 18, 1933 |
| 2,048,686 | Conklin | July 28, 1936 |
| 2,056,796 | Macht et al. | Oct. 6, 1936 |
| 2,196,803 | Wick | Apr. 9, 1940 |

FOREIGN PATENTS

| Number | Country | Date |
|---|---|---|
| 422,232 | Great Britain | Jan. 8, 1935 |